E. E. ENGLUND.
PLANTER.
APPLICATION FILED SEPT. 9, 1920.
1,377,766.
Patented May 10, 1921.
3 SHEETS—SHEET 1.
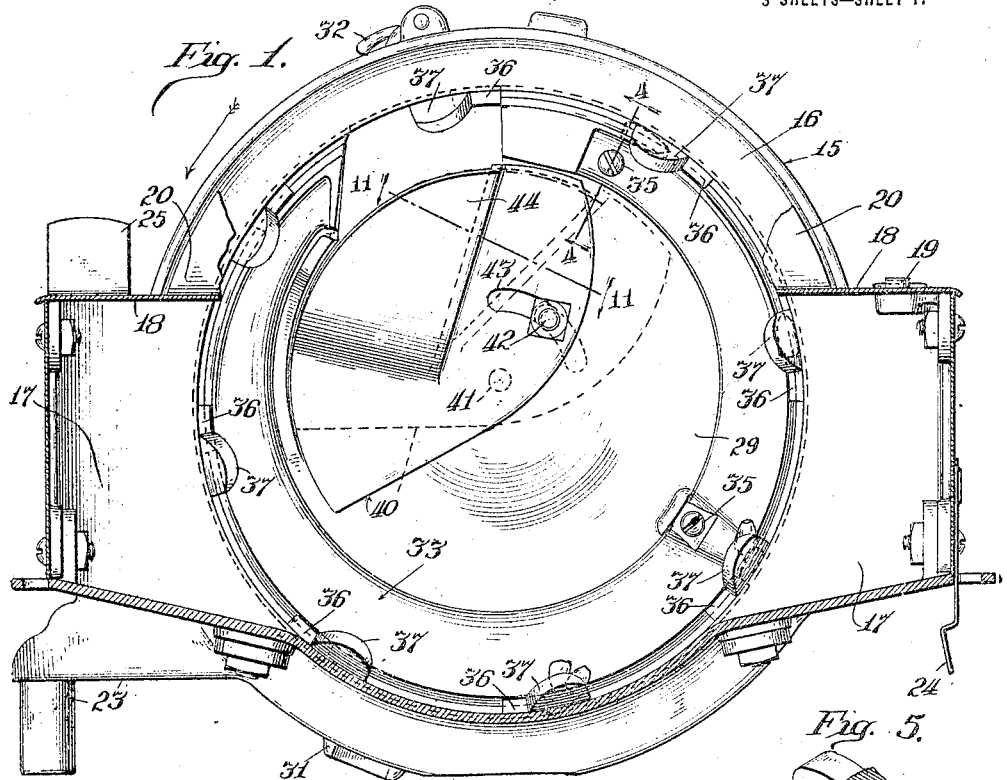
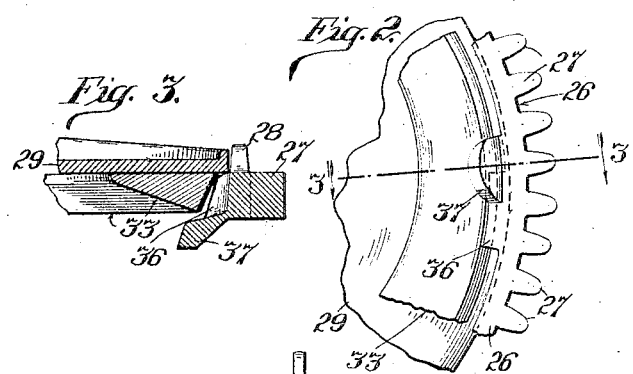
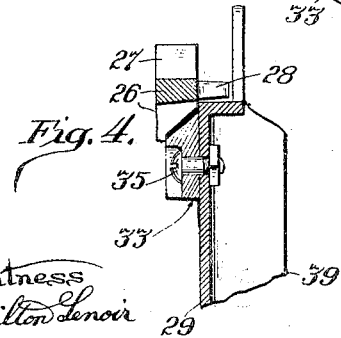

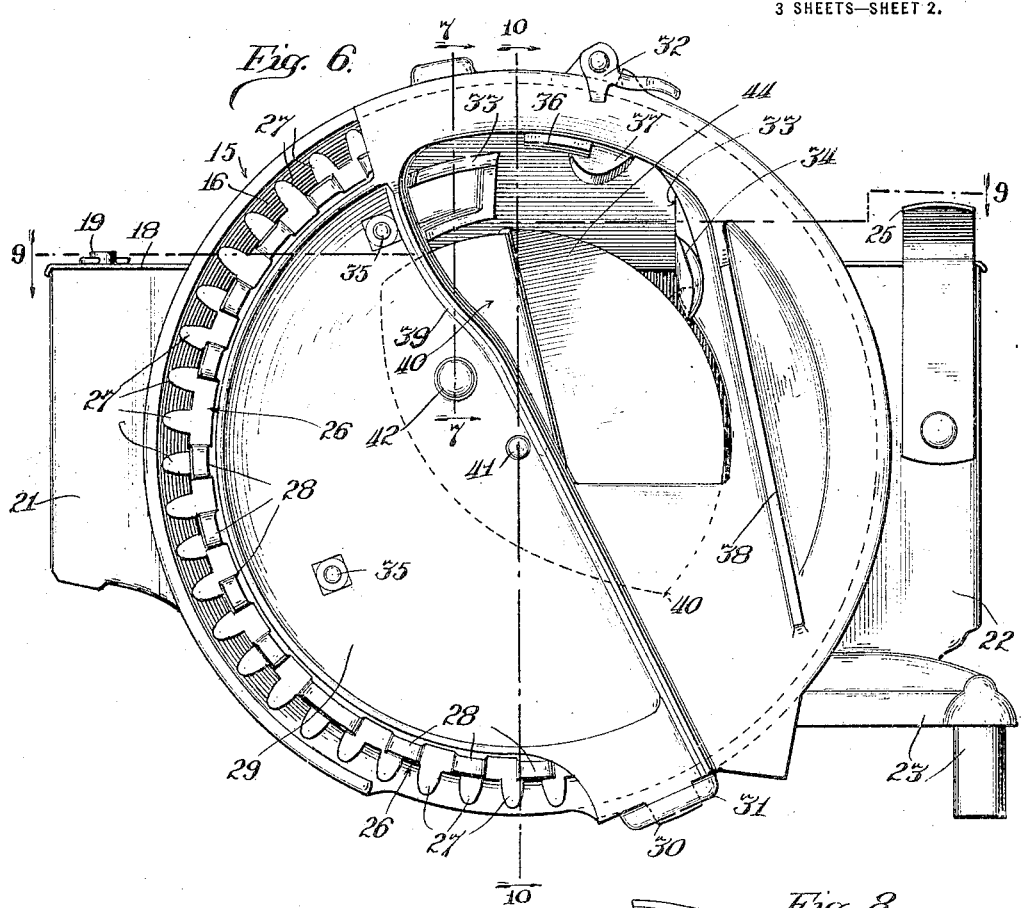
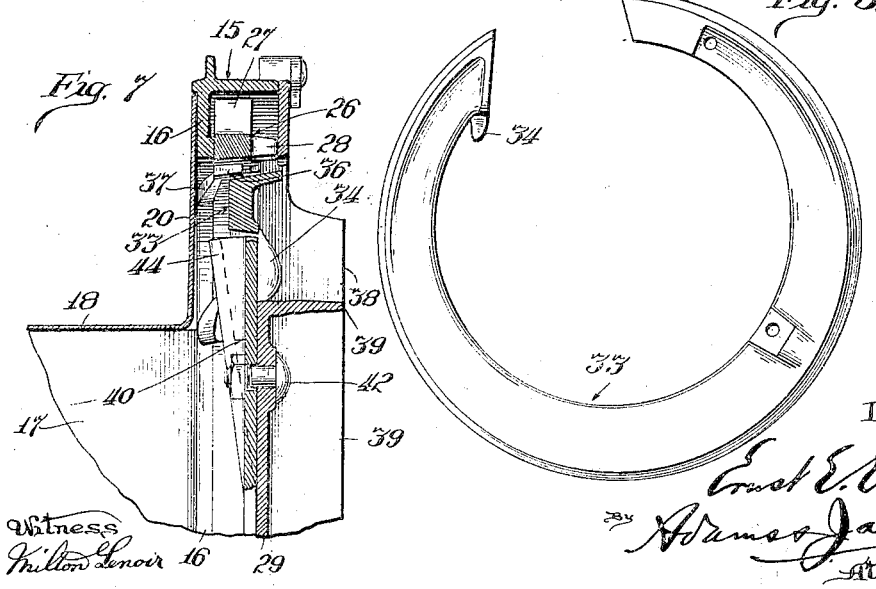

E. E. ENGLUND.
PLANTER.
APPLICATION FILED SEPT. 9, 1920.
1,377,766.
Patented May 10, 1921.
3 SHEETS—SHEET 3.
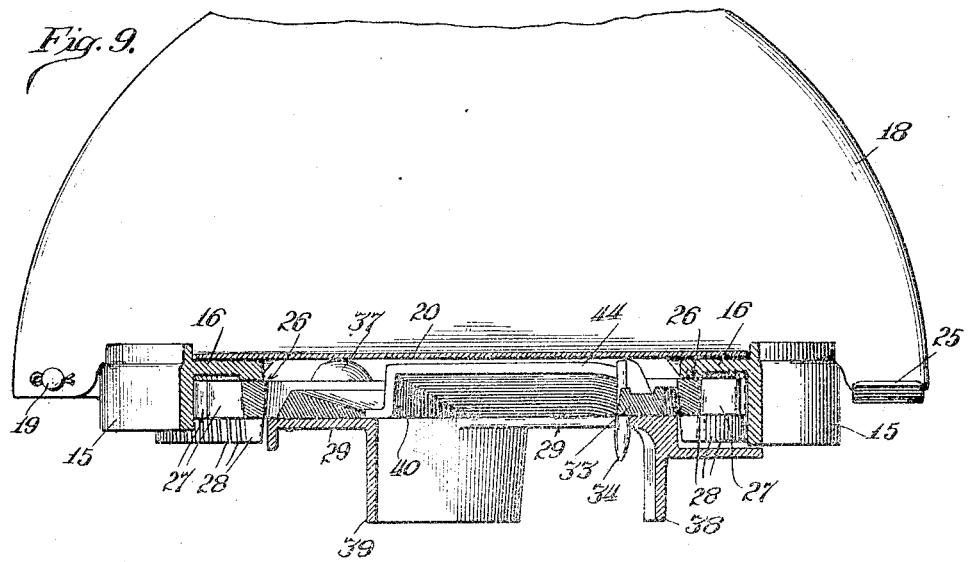
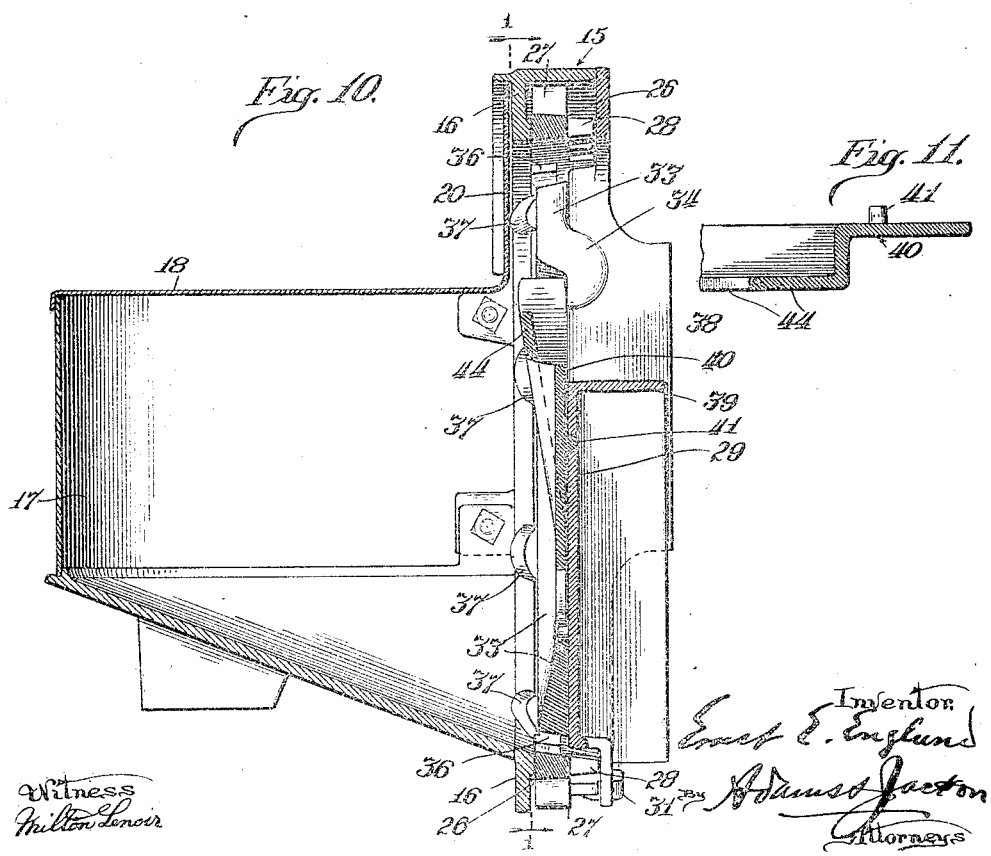

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

PLANTER.

1,377,766.     Specification of Letters Patent.     Patented May 10, 1921.

Application filed September 9, 1920. Serial No. 409,176.

*To all whom it may concern:*

Be it known that I, ERNST E. ENGLUND, a citizen of the United States, and a resident of Moline, in the county of Rock Island and State of Illinois, have invented certain new and useful Improvements in Planters, of which the following is a specification, reference being had to the accompanying drawings.

My invention relates to planters of the type shown, described and claimed by Letters Patent No. 1,314,054, granted August 26, 1919, upon my application. It is the object of my present invention to provide certain improvements by which a more regular delivery of the seed is attained without the use of a great number of different sized plates. Other objects are attained by my construction, as hereinafter set forth. The preferred means by which I have accomplished my objects are illustrated in the drawings and hereinafter described. That which I claim as my invention and desire to cover by Letters Patent is set forth in the claims.

In the drawings,—

Figure 1 is a vertical section through one of the hoppers as illustrated in the patent above referred to, being substantially a section taken on line 1—1 of Fig. 10; Fig. 2 is a fragmentary view showing the extreme right hand portion of the plate as shown in Fig. 1;

Fig. 3 is a horizontal section taken on line 3—3 of Fig. 2;

Fig. 4 is a cross-section taken on line 4—4 of Fig. 1;

Fig. 5 is a perspective view of a portion of my improved seed ring;

Fig. 6 is a face view of the hopper shown in Fig. 1;

Fig. 7 is a vertical section taken on line 7—7 of Fig. 6;

Fig. 8 is a view of an auxiliary seed ring;

Fig. 9 is a section taken on line 9—9 of Fig. 6;

Fig. 10 is a horizontal cross-section taken on line 10—10 of Fig. 6; and

Fig. 11 is an enlarged detail, being a sectional view taken on line 11—11 of Fig. 1.

Referring to the several figures of the drawings in which corresponding parts are indicated by the same reference characters,—

15 indicates a cast ring having an inwardly-extending flange 16 to which a hopper 17 is connected. As is best shown in Fig. 10, the hopper 17 is provided with a sloping bottom face so arranged as to cause the contents of the hopper to gather at the center of the hopper adjacent to the lowermost portion of the flange 16. A cover-plate 18 is pivotally mounted by means of a pin 19 (see Fig. 9), the cover plate comprising also a vertically-disposed portion 20 which closes a portion of the space opposite the upper portion of the ring 15. The ring 15 is also provided with laterally-extending wings 21 and 22 which constitute a part of the means by which the hopper is mounted in position. The hopper as a whole is supported in position by means of a lug 23 extending from one side portion, upon which lug the hopper is pivotally mounted, as is set forth in the patent above referred to. A spring latch 24 is provided at one side for latching the hopper removably in position, and a latch 25 serves to hold the cover plate 18 yieldingly in normal position.

A seed ring 26 is mounted within the ring 15 adjacent to the flange 16 so as to revolve readily in such position, being provided with gear-teeth 27 on its outer face to enable the ring to be driven from any suitable source of power. Laterally-extending teeth 28 are also provided for causing the plate to synchronize with the plate of the adjacent hopper, as is fully described in the patent above referred to. Mounted upon the ring 15 upon the side thereof opposite the flange 16 is a plate 29 which holds the seed ring in position and serves as a closure for the inner face of the hopper. As is best shown in Fig. 6, the plate 29 is removably mounted in position by means of a lug 30 extending from the plate 29 into engagement with a perforated lug 31 mounted on the ring 15, and by a pivotally mounted latch 32 which is carried by the ring in position to be turned down on the outer face of the plate.

An auxiliary seed ring 33 (see Fig. 8) is removably mounted upon the inner face of the plate 29, said ring having an opening therein at its upper side portion which stands opposite an opening in the plate 29, as is best shown in Fig. 6. The auxiliary ring 33 is held in position by means of a hook 34 which engages one edge portion of the opening in the plate 29 (see Fig. 10), together with bolts 35 which pass through the ring and through the plate. (See Figs. 1 and 6.) The ring 33 is beveled on its periphery, being spaced a short distance from the inner face of the seed ring 26. Referring now to Fig. 5, it is seen that the ring 26 is provided at intervals on its inner face with a plurality of lugs 36 which extend from the inner face of the ring 26 toward the auxiliary seed ring 33. Carried by the ring 26 slightly in advance of the lugs 36, by reference to the direction in which the ring 26 is to be rotated, there are a plurality of ears or lugs 37 which extend diagonally inwardly so as to overlap the edge of the auxiliary seed ring 33, as is best shown in Fig. 3. By the provision of the lugs 36 and 37 upon the rotary seed ring 26 in close proximity to the beveled outer edge of the stationary auxiliary seed ring 33, I have provided pockets or cells which open upwardly upon the right-hand side of the seed ring, as shown in Fig. 1, the formation of the pocket or cell being best shown by Figs. 2 and 3. When the hopper 17 is provided with a quantity of corn therein and the seed ring 26 is rotated in counterclockwise direction in Fig. 1, the kernels of corn will settle into position between the rotary seed ring 26 and the auxiliary stationary ring 33, the lugs or ears 37 serving as agitators for assisting in the necessary movement of the kernels for this purpose. As the plate rotates, carrying the lugs 36 and 37 upward, the kernels are caused to slip off from the edge of the stationary ring 33 except for the single kernel which is held in position in the pocket, as is shown by the position of the kernels at the right in Fig. 1. As is shown in Fig. 3, the slant of the outer face of the seed ring 33 is at this point slightly greater than that of the inner face of the lug 36. The slant of the outer face of the ring 33 increases, however, from this point toward the upper end of the ring 33, the slant being considerably greater at a point a short distance from the end of the ring, as is shown in Fig. 4. By reason of the greater slant of the face of the ring as shown in Fig. 4, I am assured that any surplus kernels will have slid off from the edge of the ring before such kernel reaches a point to be delivered, as hereinafter described. I have found in practice that this form of mechanism is very accurate for dispensing corn without the necessity for an accurate sizing of the corn preliminary to planting. I have found that my improved mechanism as here described is very accurate for dropping a single kernel for every movement of a cell or pocket past the delivery point.

As will be readily understood, when it is desired to plant peanuts, beans, or other classes of seed, the auxiliary seed ring 33 is readily removable, whereby the mechanism can be used as described in the above-mentioned patent by the use of a rotary seed ring of the type described in the patent in lieu of the ring 26.

As is illustrated in the patent, the plate 29 is provided on its outer face with ribs 38 and 39, which provide a chute on the outer face of the plate for receiving the seed delivered by the seed ring. Also, as is shown in the patent construction, the plate 29 is provided with an inwardly offset portion which is adapted to underlie the end portion of the stationary seed ring 33. In the construction here shown, the offset portion is provided by an auxiliary plate 40 adjustably mounted upon the plate 29. As is best shown in Fig. 6, the plate 40 is pivotally mounted upon a pin 41, being held adjustably in position by means of a bolt 42 passing through an arc-shaped slot 43 in the plate 40. By the adjustment of the plate 40 upon the plate 29, the offset portion 44 is adapted to be moved with respect to the auxiliary seed ring 33, an adjusted position thereof being shown in dotted lines in Fig. 1. By adjusting the plate 40 toward the right, as shown in dotted lines in Fig. 1, such plate 40 is adapted to receive and deliver the seed which are carried practically to the end of the ring 33, but which roll off slightly before the point at which the seed would be delivered normally.

By the use of my improved structure for planting corn, it is impossible for the kernal to become wedged in the cell or pocket so as to stick and thus fail of delivery, for the reason that the supporting wall of the cell is entirely lacking at the delivery point opposite the plate 40.

By providing for the kernels being carried on end, I have attained a greater accuracy than can otherwise be attained, for the reason that in different kinds of corn the kernels vary more in length than in their other dimensions. In my construction, the cells are sufficiently deep to hold almost any long kernel on end, but not sufficiently deep to hold two short kernels. I have found in practice that excellent results are obtained with a single seed ring for practically all varieties of corn, and I therefore consider this feature of very great importance.

While I prefer to employ a segmental auxiliary seed ring of the type illustrated in which the ring is cut entirely away for a distance at its uppermost edge portion, and in which the ring with its beveled edge spaced a short distance from the inner face of the rotary seed ring extends substantially about the entire inner face of the rotary seed ring, it will be understood that I do not wish to limit myself to these features of construction except as hereinafter specifically claimed, the essential feature being that the auxiliary ring or other part shall afford the required support for the corn as it is carried upward, while permitting the delivery of the kernel at the proper point. While I prefer also to provide the lugs 36 and 37 of about the form shown in the drawings in which they have a comparatively small length circumferentially, I do not with to be restricted to this particular form except as specifically claimed, since it is sufficient for an operative device that ample room be provided between successive lugs or shoulders for the entrance of a kernal into the desired position. By my construction, however, in which substantially the entire space between the successive shoulders is left open, greater assurance is had that the desired single kernel will become nested in position to the exclusion of all surplus kernels before the delivery point is reached.

What I claim as my invention and desire to secure by Letters Patent, is—

1. A planter comprising a hopper having an opening through a side wall portion, a rotary member in the hopper for successively raising seeds to and delivering them through said opening, and an offset member adjustably mounted with respect to said opening for varying the effective scope of the opening for the delivery of seeds therethrough.

2. A planter comprising a hopper having a straight wall portion at one side with an opening therethrough at its upper edge portion, a plate adjustably mounted on said wall and having a portion offset inwardly with respect to the hopper, and a rotary member in the hopper for successively raising seeds and delivering them to said plate for discharge from the hopper.

3. A planter comprising a hopper having an opening through a side wall portion, a rotary member in the hopper for successively raising seeds to and delivering them through said opening, and a seed discharge member mounted on the hopper wall adjacent to said opening and having a wall portion extending inwardly with respect to the hopper, said seed discharge member being adjustable with respect to the hopper wall for varying its effective scope for the discharge of seed from the hopper.

4. A planter comprising a hopper having an opening through a side wall portion, a seed ring revolubly mounted in said hopper and adapted to carry seeds upward therewith, and a seed discharge member adjustably mounted beneath the upper portion of said seed ring for delivering the seed from said seed ring through said opening.

5. A planter comprising a hopper having an opening through a side wall portion, a seed ring revolubly mounted in said hopper and adapted to carry seeds upward therewith, and a plate adjustably mounted on the side wall and closing the lower portion of said opening, said plate having at its upper edge an inwardly extending offset portion the position of which is adjustable for regulating the amount of seed delivered thereby.

6. A planter comprising a hopper, a seed ring revolubly mounted on edge in said hopper, a stationary member within said seed ring at one side thereof spaced a short distance from its inner face, means for rotating said seed ring, and means carried around by said seed ring for carrying a succession of seeds upward about said stationary member for delivery from the hopper.

7. A planter comprising a hopper, a seed ring revolubly mounted on edge in said hopper, a stationary member within said seed ring at one side thereof spaced a short distance from its inner face, means for rotating said seed ring, means carried around by said ring for carrying a succession of seeds upward about said stationary member, and means for receiving the seeds from said carrying parts at the upper edge portion of said seed ring.

8. A planter comprising a hopper, a seed ring revolubly mounted on edge in said hopper, a stationary member within said seed ring at one side thereof spaced a short distance from its inner face, means for rotating said seed ring, and means carried by the seed ring forming in coöperation with the stationary member a succession of pockets for carrying seeds upward about the stationary member for delivery from the hopper.

9. A planter comprising a hopper, a seed ring revolubly mounted on edge in said hopper, a stationary member within said seed ring at one side thereof spaced a short distance from its inner face, means for rotating said seed ring, and means carried by the seed ring forming in coöperation with the stationary member a succession of pockets each adapted to receive a single kernel of corn on end therein for carrying the kernel upward about the stationary member for delivery from the hopper.

10. A planter comprising a hopper, a seed ring revolubly mounted on edge in said hopper, a stationary member within said seed ring at one side thereof spaced a short distance from its inner face, means for rotating said seed ring, and means carried by the seed ring forming in coöperation with the stationary member a succession of pockets each adapted to receive a single kernel of corn on end therein with its flat wide face in contact with the inner face of said ring for carrying the kernel upward about the stationary member for delivery from the hopper.

11. A planter comprising a hopper, a seed ring revolubly mounted on edge in said hopper, a stationary member within said seed ring at one side thereof, the edge of said stationary member being beveled toward the hopper and being spaced a short distance from the inner face of said seed ring, means for rotating said seed ring, and means carried around by said seed ring for carrying a succession of seeds upward along the edge of the stationary member for delivery from the hopper.

12. A planter comprising a hopper, a seed ring revolubly mounted on edge in said hopper, a stationary member within said seed ring at one side thereof spaced a short distance from its inner face, means for rotating said seed ring, and means carried around by said seed ring for carrying a succession of seeds upward about said stationary member for delivery from the hopper, the edge of the stationary member being sharply beveled at a point slightly in rear of the delivery point with respect to the direction of rotation of the seed ring for causing all surplus seed to slip from the edge of said member.

13. A planter comprising a hopper, a seed ring revolubly mounted on edge in said hopper, a stationary member within said seed ring with its outer edge spaced a short distance from the inner face of the ring, said stationary member being cut away at the uppermost part of the seed ring, means for rotating said seed ring, and means carried around by said seed ring for carrying a succession of seeds upward about said stationary member for delivery at the point where said member is cut away.

14. A planter comprising a hopper, a seed ring revolubly mounted on edge in said hopper, an auxiliary stationary seed ring within said revolubly mounted seed ring with its outer edge spaced a short distance from the inner face of the revolubly mounted ring, said auxiliary ring being cut away at the uppermost part, means for rotating said revoluble seed ring, and means carried around by said revoluble seed ring for carrying a succession of seeds upward about said stationary seed ring for delivery at the point where said stationary ring is cut away.

15. A planter comprising a hopper one face of which is in the form of a removably mounted plate, a seed ring revolubly mounted on edge about said plate, a stationary member removably mounted on said plate within said seed ring with its outer edge spaced a short distance from the inner face of the ring, means for rotating said seed ring, and means carried around by said seed ring for carrying a succession of seeds upward about the stationary member for delivery from the hopper.

16. A planter comprising a hopper one face of which is in the form of a removably mounted plate, a seed ring revolubly mounted on edge about said plate, a stationary auxiliary seed ring removably mounted on said plate within said revoluble seed ring with its outer edge spaced a short distance from the inner face of the revoluble seed ring, means for rotating said revoluble seed ring, and means carried around by said revoluble seed ring for carrying a succession of seeds upward about the stationary seed ring for delivery from the hopper.

17. A planter comprising a hopper, a seed ring revolubly mounted on edge in said hopper, a stationary member within said seed ring at one side thereof spaced a short distance from the inner face of said seed ring, and means for rotating said seed ring, said seed ring being provided with shoulders spaced about its inner face and extending inwardly into close proximity to said stationary member for carrying kernels of corn upwardly about the edge of said stationary member.

18. A planter comprising a hopper, a seed ring revolubly mounted on edge in said hopper, a stationary member within said seed ring at one side thereof spaced a short distance from the inner face of said seed ring, means for rotating said seed ring, and inwardly-extending lugs on the inner face of said seed ring for carrying kernels of corn upwardly about the edge of said stationary member.

19. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and means for preventing the kernels in contact with said lugs from slipping from the edge of said stationary member as they are moved upward.

20. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and means carried by said seed ring in connection with each of said lugs for preventing the kernel in contact with the lug from slipping from the edge of the stationary member as it is moved upward thereabout.

21. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs extending in advance of said inwardly-extending lugs in the direction of rotation of said seed ring for preventing the kernels in contact with said inwardly-extending lugs from slipping from the edge of the stationary member as they are moved upward.

22. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs having their inner faces at right angles to the forward faces of said inwardly-extending lugs in the direction of rotation of said seed ring for preventing the kernels in contact with said inwardly-extending lugs from slipping from the edge of the stationary member as they are moved upward.

23. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and means for preventing the kernels in contact with said lugs from slipping from the edge of said stationary member as they are moved upward, the outer edge of said stationary member being beveled for causing all surplus kernels to slip from the edge thereof back into the hopper.

24. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs having their inner faces at right angles to the forward faces of said inwardly-extending lugs in the direction of rotation of said seed ring for preventing the kernels in contact with said inwardly-extending lugs from slipping from the edge of the stationary member as they are moved upward, the outer edge of said stationary member being beveled for causing all surplus kernels to slip from the edge thereof back into the hopper.

25. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs arranged circumferentially on the inner face of said ring slightly in advance of said inwardly-extending lugs in the direction of rotation of said seed ring for preventing the kernels from slipping from the edge of said stationary member as they are moved upward.

26. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs carried by said seed ring extending along the side of said stationary member in advance of said inwardly-extending lugs in the direction of rotation of said seed ring for preventing the kernels in contact with said inwardly-extending lugs from slipping from the the edge of the stationary member as they are moved upward.

27. A planter comprising a hopper, a seed ring revolubly mounted on edge in said hopper, a stationary member within said seed ring at one side thereof spaced a short distance from the inner face of said seed ring, and means for rotating said seed ring, said seed ring being provided with shoulders spaced about its inner face and extending inwardly into close proximity to said stationary member for carrying kernels of corn upwardly about the edge of said stationary member, said stationary member being cut away at the uppermost edge portion of the seed ring whereby the corn is permitted to drop out of contact with the seed ring for delivery from the hopper.

28. A planter comprising a hopper, a seed ring revolubly mounted on edge of said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs extending in advance of said inwardly-extending lugs in the direction of rotation of said seed ring for preventing the kernels in contact with said inwardly-extending lugs from slipping from the edge of the stationary member as they are moved upward, said stationary member being cut away at the uppermost edge portion of said ring whereby the corn is permitted to drop out of contact with the seed ring for delivery from the hopper.

29. A planter comprising a hopper, a seed ring revolubly mounted on edge in said hopper, a stationary member within said seed ring at one side thereof spaced a short distance from the inner face of said seed ring, means for rotating said seed ring, inwardly-extending lugs spaced about the inner face of said seed ring for carrying kernels of corn upward between the seed ring and said stationary member, and other lugs having their inner faces at right angles to the forward faces of said inwardly-extending lugs in the direction of rotation of said seed ring for preventing the kernels in contact with said inwardly-extending lugs from slipping from the edge of the stationary member as they are moved upward, the outer edge of said stationary member being beveled for causing all surplus kernels to slip from the edge thereof back into the hopper, said stationary member being cut away at the uppermost edge portion of the seed ring whereby the corn is permitted to drop out of contact with the seed ring for delivery from the hopper.

ERNST E. ENGLUND.